May 3, 1927.
A. KATZINGER
COVERED PAN
Filed Sept. 2, 1926.
1,627,541
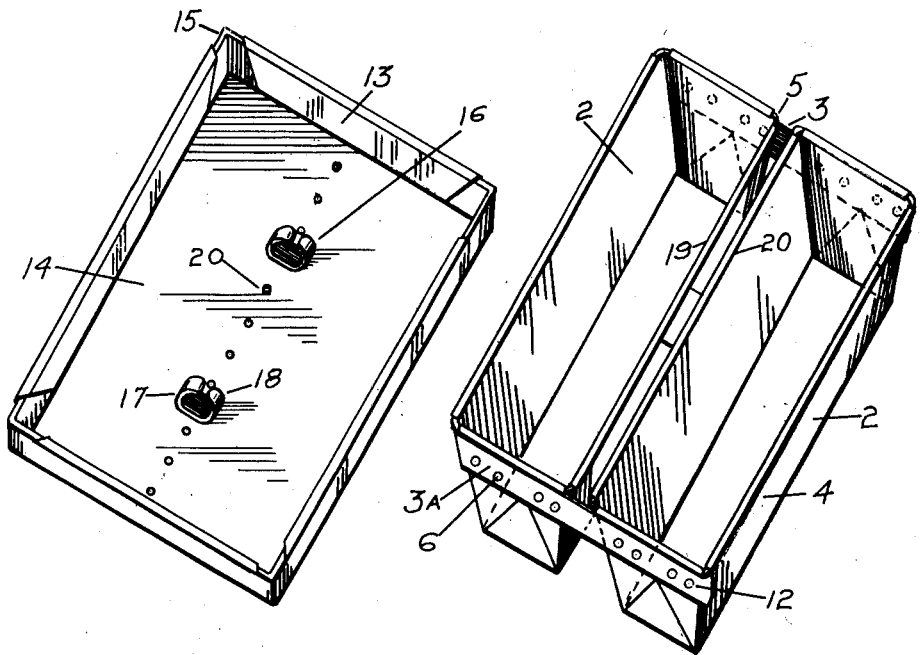
FIGURE II    FIGURE I
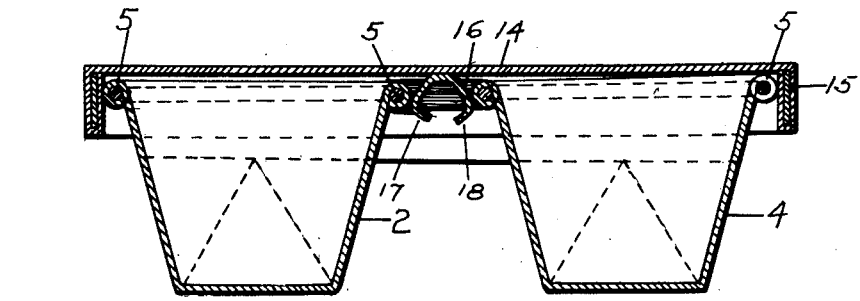
FIGURE III
ARTHUR KATZINGER
INVENTOR.
W. A. Darrah,
ATTORNEY.

Patented May 3, 1927.

1,627,541

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS.

COVERED PAN.

Application filed September 2, 1926. Serial No. 133,256.

This invention relates to a combination of pans and cover with certain attachments therefor which may be employed for a variety of purposes, but particularly in connection with the baking of bread or related products.

The equipment which forms the basis of this invention is frequently used in connection with the article known as Pullman loaves which are the well known long loaves of bread having a substantially square cross section.

One of the objects of this invention is to provide a cover for a multiple group of pans. Another object is to so arrange the pans and cover that the loaf baked in the pan will be substantially flat on all sides including the top. Other objects are to provide a means for holding the cover in place during handling and against the pressure of the rising bread, and at the same time to provide a means for readily and easily attaching and detaching the cover at any desired time.

Further objects are to provide a structure which will be unusually strong and durable, but at the same time as light and inexpensive as possible, as well as providing a construction which can be attached or removed with the minimum amount of skill and very quickly.

Other objects will be apparent from the disclosures which follow and the drawing.

In the manufacture of certain kinds of bread, it is customary to produce a loaf having a parallelopiped form in which the sides are substantially flat and the corners are substantially 90° but providing, however, a certain amount of draft or tapper for the ready removal of the loaf from the pan.

In forming such a loaf it is, of course, necessary to cover the top of the pan as otherwise the top of the loaf would have the ordinary curved or arched shape which is common in uncovered loaves.

In producing such a loaf an effort is made to put just sufficient dough in the pan so that when it rises during the baking process, the pan will be completely filled. The amount of raw dough placed in the pan, of course, only partially fills it prior to baking.

As the bread rises it, of course, exerts a pressure on the cover of the pan which pressure, providing the cover remains in place, serves to force the loaf into the corners forming a square true loaf of the desired shape. It sometimes happens, due for example to the over-proofing of the dough, the variation in the amount, nature or portion of the ingredients that considerable pressure is exerted upon the pan cover in order to counter-act this pressure it is, therefore, desirable to attach the pan cover to the pans in some manner which will resist a considerable amount of pressure.

In the past, this result has been secured by making the top cover heavy and relying upon the weight of the cover to hold it in place. This method is open to numerous objections such as the high cost of the cover, the rapid deterioration of the pans and cover, the effort in handling the extra weight and the effect of the heavy cover in withdrawing heat from the bread and the oven thus affecting the quality of the loaf and increasing the fuel consumption. Further the heavy cover can only exert an amount of pressure equal to its own weight, which sometimes is not sufficient.

My invention is designed to overcome the difficulties mentioned above and to secure the objects previously enumerated and thus outlined below.

One form of my invention is shown in the accompanying drawing which forms a part of this specification. In the drawing Figure I shows a perspective view of two pans, while Figure II shows a perspective view inverted of a cover designed to cooperate with the pair of pans in accordance with my invention. Figure III shows a sectional view of the pans with the cover in place.

I have shown in the drawing a multiple pan set made up of two individual pans, but it will be apparent that any number of pans may be included in the set by having the size of the frame, the cover and the clips to suit. It will also be apparent that the sizes, shapes and details of the pans and cover may be varied at will without departing from the spirit of my invention.

Referring more specifically to the drawing, I have shown the pans (2) held together with straps (3) and (3ᴬ). The pans may be made in the conventional method by folding a sheet of tin plate (4) and rolling the upper edges round a heavy wire frame (5). The ends of the pans are folded in and held by rivets (6) while a pair of straps (3) and (3ᵃ) extend along the short edges of the pans and are riveted to the pans by rivets (6), the same rivets thus serving to hold the pan folded and the straps to the pan.

Cover (13) is made from a sheet of heavy metal (14) formed by bending over and around a rectangular strap (15). A series of clips (16) are attached to the cover by riveting, spot welding or other equivalent means. The clips are so located that when the cover is placed on a group of pans the clips will lie on the center line of the opening between the pans thus engaging with the upper edges of the pans in a resilient manner and hold the cover against accidental displacement.

The clips are formed with the curved contour and are provided with legs (17) and (18) which may be forced toward each other when the cover is placed on the pans and which spring open when the cover is in place.

In the same way the adjacent edges (19) and (20) which engage with the legs (17) and (18) are resilient and serve to yieldingly hold the cover in place.

The degree of pressure required to apply or remove the cover may, of course, readily be controlled by modifying the design of the pan, particularly the edges (19) and (20) or the design of the clips.

A series of perforations (21) which are shown as circles, but may be of any desired contour, are placed in the cover above the opening between adjacent pans and serve as vents to permit a circulation of air between the pans and through the cover. I have found that such a circulation of air is decidedly advantageous in securing uniform, effective and satisfactory baking.

In the construction which I have invented it is possible to quickly and easily apply or remove the cover from the group of pans with no unusual effort while, on the other hand, ample pressure is available to successfully resist the upward force of the rising loaf against the cover.

Pans of the type here described are used in large quantities in commercial bakeries and are subjected to severe service conditions which tend to bend, distort or break the pans and covers.

Any means of attaching a cover which depends on the alignment of the outside edges of the pans or upon their condition, or upon bosses or attachments made thereon, is likely to cause trouble due to the distortion, bending, denting or breakage of the pan.

On the other hand, the clips which form the attaching means in the case of my invention act on the inner adjacent edges of the pans. These edges are in practice protected by the pan's edges and, therefore, are not subjected to the distortion, bending and other forces which destroy the outer edges of the pans. For this reason, covers made in accordance with my invention are much more durable and cause less difficulty than any other type of which I am now aware.

Further the force which serves to hold the pans and the cover together is applied in the case of my invention at or near the center of the cover instead of at the edges. For this reason, the clips are able to more effectively hold the cover in place and permit less bulging or bending of the cover. This further permits the use of lighter metal in the cover or results in a strong construction with the same weight of metal.

The clips being within the cover are protected to a large extent from bending or distortion in handling and, therefore, give a longer life than in case the attaching device is placed on the outside edges of the cover.

It will be obvious that this structure may be modified in many ways without departing from the spirit of this invention. Thus any number of pans may be included in a set with substantially the same results. The details of construction of the pans and cover may be modified in obvious details all within the scope of this invention.

Having now fully disclosed my invention what I claim as new and wish to secure by Letters Patent in the United States is as follows:

1. A multiple of spaced pans attached together to form a unit, a reinforced resilient lip extending outwardly around the upper edges of each of said pans, a cover for said pans carrying resilient bosses attached to its inner surface and located for engagement with the adjacent edges of said pans, and vents in said cover, said vents being substantially above the spaces between adjacent pans.

2. A multiple of spaced pans of rectangular shape with open top, said pans being attached together to form a unit, a reinforced resilient lip extending outwardly and around the upper edges of each of said pans, a cover for said pans, said cover carrying resilient bosses attached to its inner surface, said bosses arranged to engage with the upper resilient edges of adjacent pans entering the space formed between the adjacent pans.

ARTHUR KATZINGER.